United States Patent [19]

Coleman

[11] Patent Number: 4,532,800
[45] Date of Patent: Aug. 6, 1985

[54] LEVEL INDICATOR FOR LIQUID CONTAINER WITH A FOLLOWER

[75] Inventor: Clarence B. Coleman, Oakland, Calif.

[73] Assignee: Fabricated Metals, Inc., San Leandro, Calif.

[21] Appl. No.: 557,045

[22] Filed: Dec. 1, 1983

[51] Int. Cl.³ .................... B65D 88/42; G01F 23/12
[52] U.S. Cl. .................... 73/308; 116/228; 220/226
[58] Field of Search .................... 73/308, DIG. 5; 200/84 C; 220/226; 15/246.5

[56] References Cited

U.S. PATENT DOCUMENTS

| | | | |
|---|---|---|---|
| 354,508 | 12/1886 | Fraleigh | 73/308 |
| 530,592 | 12/1894 | Kleritj | 73/308 |
| 981,434 | 1/1911 | Lander | 73/321 |
| 1,658,449 | 2/1928 | Loffler | 73/321 |
| 2,074,959 | 3/1937 | Guest | 73/82 |
| 2,677,816 | 5/1954 | Quist | 340/244 |
| 2,949,777 | 8/1960 | Ferron | 73/321 |
| 3,114,478 | 12/1963 | Hilkemeier et al. | 73/308 X |
| 3,159,301 | 12/1964 | Anderson | 220/93 |
| 3,618,812 | 11/1971 | Maeder | 15/246.5 X |
| 3,781,942 | 1/1974 | Coleman | 15/246.5 |
| 3,942,526 | 3/1976 | Wilder et al. | 128/214 E |
| 3,964,312 | 6/1976 | Sebek | 73/314 |
| 4,185,336 | 1/1980 | Young | 200/84 C |
| 4,290,059 | 9/1981 | Noyes et al. | 340/624 |
| 4,353,478 | 10/1982 | Clark | 220/226 X |
| 4,437,577 | 3/1984 | Myers et al. | 220/226 X |

Primary Examiner—Daniel M. Yasich
Attorney, Agent, or Firm—Jack M. Wiseman

[57] ABSTRACT

A bulk material container comprises a shell made from suitable material, such as aluminum or stainless steel. Disposed within the shell is a follower. The vertical position of the follower varies with the level of flowable bulk material stored in the shell. A permanent magnet is carried by the follower for movement therewith and a magnetic switch operatively responsive to the magnetic field created by the permanent magnet is attached to the exterior of the shell to detect the height of the permanent magnet. A level indicator is responsive to the operation of the magnetic switch for indicating the level of the follower.

4 Claims, 4 Drawing Figures

U.S. Patent  Aug. 6, 1985  4,532,800
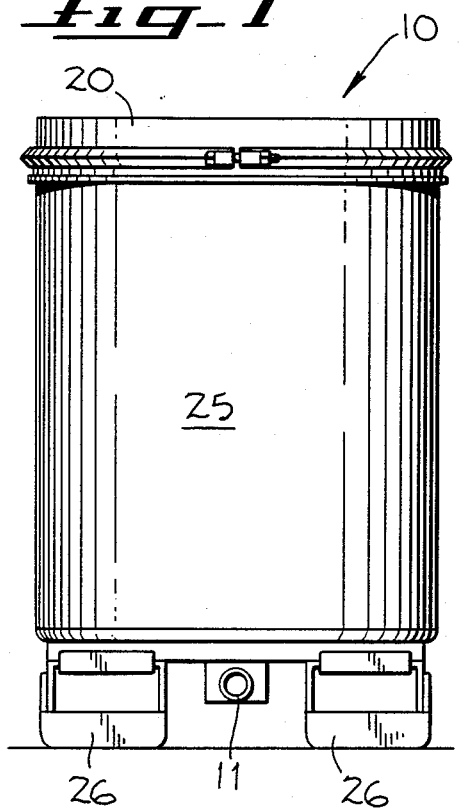
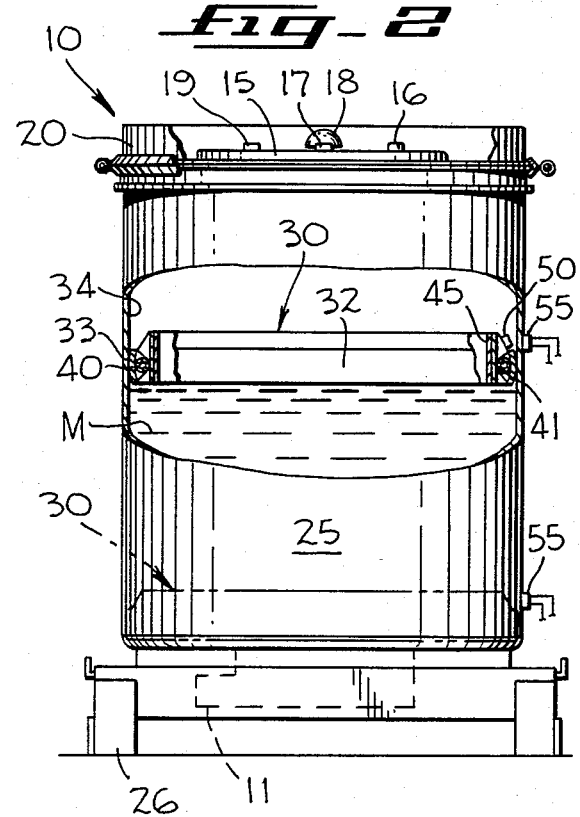
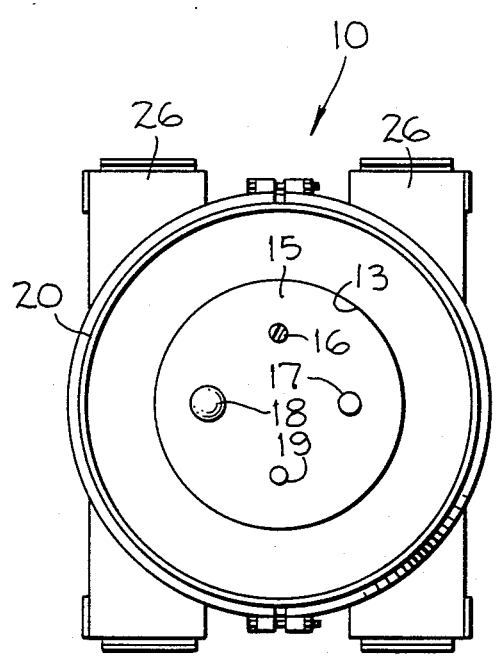
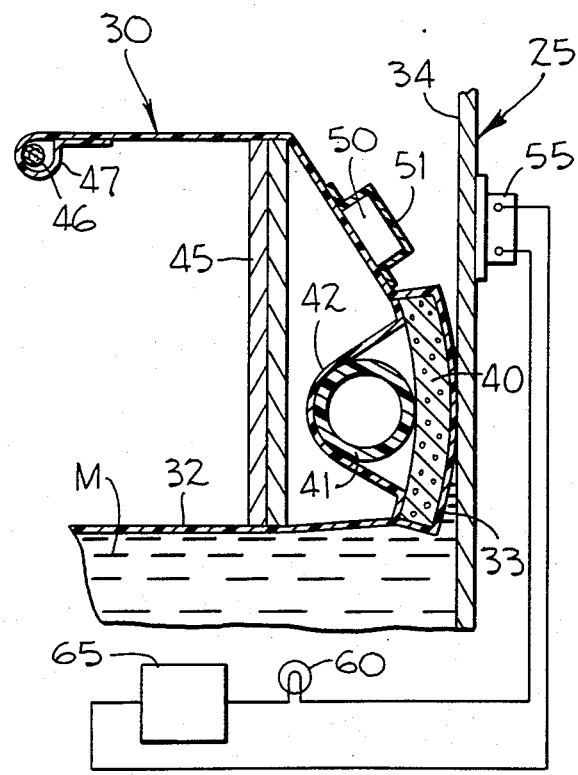

LEVEL INDICATOR FOR LIQUID CONTAINER WITH A FOLLOWER

BACKGROUND OF THE INVENTION

The present invention relates in general to bulk material container having a follower therein, and more particularly to a bulk material container having a follower therein and a material level indicator supported exteriorly thereof.

Fabricated Metals, Inc. of San Leandro, Calif., has manufactured and sold a bulk material container having a material level follower disposed in the shell thereof. The vertical position of the material level follower varies with the level of the bulk material within the shell. A material level indicator is mounted exteriorly of the shell and comprises level indicating means with indicium. A cable is attached at one end to the material level follower. The other end of the cable is attached to an indicium marked counterweight that is received by the level indicating means. The location of the indicium on the counterweight relative to the indicium on the level indicating means provides a reading of the level of the material in the shell.

In the patent to Coleman, U.S. Pat. No. 3,781,942, there is disclosed a container for bulk material. A flexible follower assembly is disposed within the container. The flexible follower freely follows the height of the bulk material within the container.

The patent to Kleritj, U.S. Pat. No. 530,592, issued on Dec. 11, 1894 for Magnetic Water Gauge, discloses a container for liquid. Mounted exteriorly of the container is a liquid level vessel which communicates with the container. The level of the liquid in the vessel follows the level of the liquid in the container. A float is disposed in the liquid level vessel to follow the height of the liquid in the vessel. A magnet is carried by the float. Exteriorly of the vessel and mounted thereon is a tube. Disposed within the tube in vertically spaced relation are electrical switches. The height of the magnet selectively operates a switch within the tube. Certain of the switches are connected to an electrical alarm circuit.

The patent to Wilder et al., U.S. Pat. No. 3,942,526, issued on Mar. 9, 1976 for Alarm System For Intravenous Infusion Procedure, discloses a drop chamber in which is disposed a magnetic float. The float level reflects the height of the liquid in a container communicating with the drop chamber. A proximity switch is attached to the exterior of the drop chamber. When the liquid in the container falls below a predetermined height, the magnet in the magnetic float activates the proximity switch to operate an alarm.

The patent to Guest, U.S. Pat. No. 2,074,959, issued on Mar. 23, 1937, for Fuel Tank Gauge, discloses a follower disposed on the surface of liquid contained in a tank. One end of a cable is attached to the follower. The opposite end of the cable is tensioned by attachment to an anchored spring. Intermediate the ends thereof, the cable advances through a dial. Movement of the cable actuates an indicator of the dial to register the level of the liquid in the container.

In the patent to Quist, U.S. Pat. No. 2,677,816, issued on May 4, 1954, for Floating Roof Tank Warning Device, there is disclosed a floating roof that follows the level of liquid in a storage tank. A vertically disposed liquid depth indicator is mounted exteriorly of the storage tank. One end of a cable is attached to a float mechanism incorporated in the floating roof. The other end of the cable is attached to a weight marker. Movement of the weight marker along the vertical indicator shows the level of the liquid in the container.

The patent to Loeffler, U.S. Pat No. 1,658,449, issued on Feb. 7, 1928, for Fluid Level Indicator For High Pressure Vessels Or Containers, discloses a steam boiler and a liquid level gauge in communication with the steam boiler. The liquid level gauge is disposed exteriorly of the steam boiler. A float is disposed in a vessel of the liquid level gauge. One end of the cable is attached to the float. The other end of the cable is attached to a counterweight. Intermediate the ends thereof, the cable passes through a U-shaped tube. Surrounding the section of the U-shaped tube in the vicinity of the counterweight are magnetic coils. The counterweight is also a magnetic core for varying the magnetic fields produced by the magnetic coils. As the level of the float in the liquid level gauge varies, the magnetic fields produced by the coils will vary. A level indicator adjacent the magnetic coils will have the position of the indicator pointer thereof vary in response to variations in magnetic fields resulting from the varying position of the counterweight.

SUMMARY OF THE INVENTION

A bulk material container in which is disposed a material level follower. The vertical position of the follower within the shell of the bulk material container varies with the level of the bulk material within the shell. A magnet is carried by the follower at the perimeter thereof radially spaced from the axis thereof. Means responsive to a magnetic field of the magnet are mounted on the exterior of the shell adjacent the path of travel of the magnet to be activated by the magnet advancing to a preselected height.

A feature of the present invention is the provision of a magnet for indicating the height of bulk flowable material in a shell suitable for storing bulk viscous material, such as grease, ink, pigment and the like.

Another feature of the present invention is that a follower not only wipes the wall of the shell of the container as it follows the surface of the bulk material removed from the shell, but also carries the magnet in its movement in the shell.

DESCRIPTION OF THE DRAWINGS

FIG. 1 is an elevation view of the bulk material container embodying the present invention.

FIG. 2 is an elevation view of the bulk material container shown in FIG. 1 with a section thereof cut-a-away to illustrate the flexible follower, the magnet carried therewith, and the magnetic switch mounted exteriorly of the shell of the bulk material container.

FIG. 3 is a plan view of the bulk material container shown in FIG. 1.

FIG. 4 is an enlarged fragmentary sectional view of the flexible follower shown with a section of the shell of the bulk material container to illustrate the magnet carried on the flexible follower and an enlarged illustration of the magnetic switch mounted exteriorly of the shell of the bulk material container shown with a diagrammatic illustration of an electrical circuit for indicating the height of the flexible follower.

DETAILED DESCRIPTION OF THE PREFERRED EMBODIMENTS

Illustrated in FIGS. 1-3 is a bulk material container 10 holding viscous material M (FIG. 4) in the process of either being withdrawn or placed into a shell 25 of the container 10 through a conduit 11 (FIG. 1) by means of a suitable pump assembly, not shown. In the preferred embodiment, the pump assembly is a sump pump. The shell 25 of the container 10 is provided with an access opening 13 (FIG. 3) of conventional type and size. In a bulk material container, the access opening is generally large enough for an operator to pass through so as to be able to inspect, repair and clean the interior of the shell of the container. The access opening 13 receives a cover 15 made of suitable material, such as mild steel. The shell 25 of the container 10 may be made of suitable material, such as mild steel, stainless steel or aluminum. The top of the shell 25 of the container 10 is made of suitable material, such as mild steel.

Disposed in the cover 15 is a plug 16, a suitable vacuum vent valve 17, a suitable pressure relief valve 18, and a suitable opening 19 for supplying fluid under pressure. A stacking ring 20 encircles the shell 25 in the vicinity of the cover 15. At the bottom of the shell 25 of the container 10 are fork entry skids 26.

A flexible follower 30 (FIGS. 2 and 4) is disposed in the shell 25 of the container 10 and follows the level of the surface of the material M. It urges the material M into the pump assembly, not shown, via the conduit 11 during the draining of the material M from the shell 25 of the container 10. A flexible follower and shell generally of the type herein described is disclosed in detail in the patent to Coleman, U.S. Pat. No. 3,781,942, issued on Jan. 1, 1974 for Follower For Material Containers. A flexible follower and shell generally of the type herein described is disclosed in detail in my pending application, Ser. No. 06/120,629, filed on Feb. 11, 1980, for Material Container Having A Flexible Follower now U.S. Pat. No. 4,471,892, issued on Sept. 18, 1984. The assignee of the present application is also the assignee of the cited pending application.

The flexible follower 30 comprises a diaphragm 32 made from a suitable fabric, such as neoprene coated nylon fabric. The diaphragm 32 is disposed coextensive with the transverse cross-section of the shell 25. The fabric for the diaphragm 32, in the preferred embodiment, is a liquid impervious material, which is flexible and is relative thin and cloth-like. Neoprene coated material, such as canvas, is suitable for these purposes.

By employing a flexible follower, the follower can be folded to a collapsed form for removal from or entry into the shell 25 through the access opening 13 and can be expanded in the shell 25 to perform its intended functions. The diameter of the outermost wall 33 of the diaphragm 32 is dimensioned so as to engage substantially the inner surface 34 of the shell 25. Disposed along the outermost wall 33 of the diaphragm 32 and container within the diaphragm 32 is an annular sponge 40.

While the exemplary embodiment makes reference to a sponge, it is apparent that other suitable material may be employed equally as well. The sponge 40 and the outermost wall 33 form a wiper for cleaning the inner surface 34 of the shell 25 as bulk material is withdrawn from the container 10.

Adjacent to the sponge 40 at the inboard side thereof is a stiffener, such as a tubular plastic ring 41, which serves to rigidify the circumferential portion of the diaphragm 32. An annular sleeve 42 made of suitable material, such as canvas, is fixed to the diaphragm 32 at the top and the bottom of the annular sponge 40 to retain the tubular plastic ring 41 in a fixed position relative to the diaphragm 32.

The sponge 40 is flexible and foldable so as to be contracted for removal from and insertion into the shell 25 through the access opening 13. The sponge 40 is expanded in the shell 25 for the cleaning of the inner surface 34 of the shell 25. The plastic ring 41 may be split for compression to facilitate its removal from and insertion into the shell 25 through the access opening 13. When expanded in the annular sleeve 42 within the shell 25, the ring 41 is suitable to provide a stiffener for the circumferential rim of the diaphragm 32.

Inboard of the sleeve 42 and disposed within the diaphragm 32 adjacent to the sleeve 42 is a suitable weight ring 45, made of metallic material such as mild steel. The weight ring 45 may be split for removal of and insertion into the shell 25 of the container 10 and for assembling in the diaphragm 32. After the weight ring 45 is inserted into the shell 25 and assembled in the diaphragm 32, the adjacent ends thereof at the split are secured together through a connecting plate fixed at one end and having an opening at the other end of the connected plate to receive a threaded stud to form a unitary structure for the weight ring 45. Thus, the weight ring 45 can be removed from and inserted into the shell 25 through the access opening 13 of the shell 25 of the container 10. When inserted into the diaphragm 32, the weight ring 45 is fully extended. Such a ring for a flexible follower has been fully described in the aforementioned pending application, Ser. No. 06/120,629 now U.S. Pat. No. 4,471,892.

Should it be desired to assure a complete and snug fitting of the wiper against the inner wall 34 of the shell 25, a turnbuckle, not shown, may be provided having adjustable threaded rods whose outer ends are secured in sockets, mounted respectively on the inner surfaces of the ring 45. The aforementioned turnbuckle is described in detail in the aforementioned U.S. Pat. No. 3,781,942. A draw string 46 is provided within a seam welt 47.

Fixed to the outermost wall 33 of the diaphragm 32 is a suitable permanent magnet 50. In the exemplary embodiment, the magnet 50 is secured to the outermost wall 33 by a canvas strip 51, which is sewn onto the outermost wall 33 of the diaphragm 32. It is within the contemplation of the present invention to secure a plurality of magnets 50 on the outermost wall 33 of the diaphragm 32. The plurality of magnets 50 will assure close proximity to the shell 25 in the event the follower 30 develops a slight convex or concave configuration in its up or down movement. In the exemplary embodiment, the magnets 50 are of the type manufactured by McMaster-Carr as catalogue No. 89, of approximate pull of 120 pounds.

Mounted on the outer wall of the shell 25 is suitable means responsive to a magnetic field, such as a magnetic switch 55. The switch 55 can be fixed to the shell 25 or can be detachably secured to the shell 25. The height of the switch 55 can be selected dependent on the material level indicator function. The height of the switch can be selected to indicate when the level of the material M in the shell 25 of the container 10 has dropped to a point requiring refilling or the replacement by a filled bulk material container or when the level of the material M in the shell 25 of the container 10 has reached a height requiring the cessation of the filling operation. The switch 55 can be moved vertically to determine the location of the height of the material M in the shell 25 of the container 10.

In the event the shell 25 of the container 10 is made of material other than aluminum or stainless steel, such as mild steel, then the section of the shell 25 of the container 10 at which one or more of the magnetic switches 55 is located will be removed and replaced with a strip of material, such as stainless steel or aluminum. The replacement of the removed section of the shell 25 of the container 10 with a strip such as aluminum or stainless steel can be carried out by welding or any suitable means. More specifically, material that provides a path for the passage of a magnetic field or magnetic flux need not have a strip inserted into the shell 25. On the other hand, material that does not provide a suitable path for the passage of a magnetic field or magnetic flux does require the inserted strip.

Connected to each of the magnetic switches 55 is a suitable level indicator 60 (FIG. 4) such as a light or an alarm, or a relay to activate a level indicator, or a solenoid valve. In the exemplary embodiment, a suitable source of power 65 is connected in series with the magnetic switch 55 and the level indicator 60.

In operation, the movement of the follower 30 to a predetermined height moves the magnet 50 at a level to activate the magnetic switch 55. The activation of the magnetic switch operates the level indicator 60.

I claim:

1. A container for bulk material comprising:
    (a) a shell for storing bulk material, said shell being formed with an upright cylindrical wall having an inner surface and an outer surface and a bottom wall, said bottom wall provided with means for removing the bulk material from the shell;
    (b) a diaphragm follower disposed in said shell and dimensioned to engage flexibly the inner surface of said shell for wiping the inner surface of said shell as the bulk material is removed from said shell, said follower being movable over a vertical rectilinear path in constant contact with the upper surface of the bulk material stored in said shell;
    (c) a magnet mounted on said follower interiorly of said shell for movement therewith; and
    (d) means responsive to the magnetic field of said magnet and supported by said wall along said outer surface, said means connected to level indicating means, said means being activated by the magnetic field of said magnet when said follower moves to the approximate height of said means.

2. A container as claimed in claim 1 wherein at least a section of said upright wall is made of material through which a magnetic field passes, said section being disposed in the vicinity of said means, and wherein said means is operatively responsive to the magnetic field of said magnet when said magnet is disposed adjacent said section.

3. A container as claimed in claim 1 wherein said upright wall generally is made of material through which a magnetic field does not pass, said upright wall includes a section made of material through which a magnetic field passes, said section being disposed in the vicinity of said means, said means being disposed at a preselected height, and wherein said means is operatively responsive to the magnetic field of said magnet when said magnet in its movement with said follower over said vertical rectilinear path travels in the vicinity of said preselected height.

4. A container as claimed in claim 1 wherein said follower is a flexible diaphragm follower, said follower comprising:
    (a) a diaphragm of flexible material having a perimeter dimensioned to engage said inner surface,
    (b) stiffener means on said diaphragm to urge said diaphragm in engagement with said inner surface, and
    (c) wiper means on said diaphragm along the perimeter thereof for wiping said inner surface,
    (d) said magnet being mounted on said diaphragm adjacent said wiper means.

* * * * *